Patented June 22, 1926.

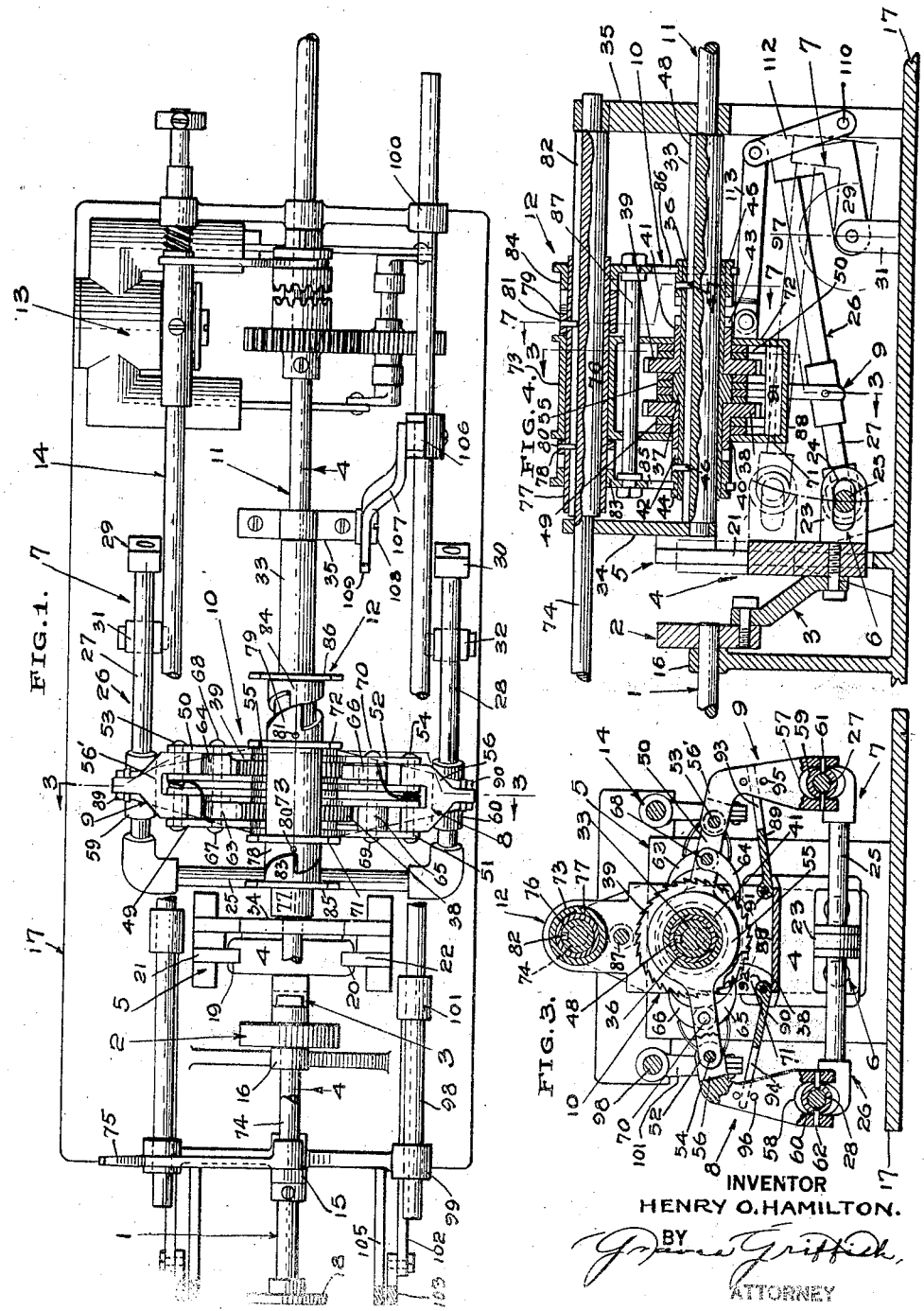

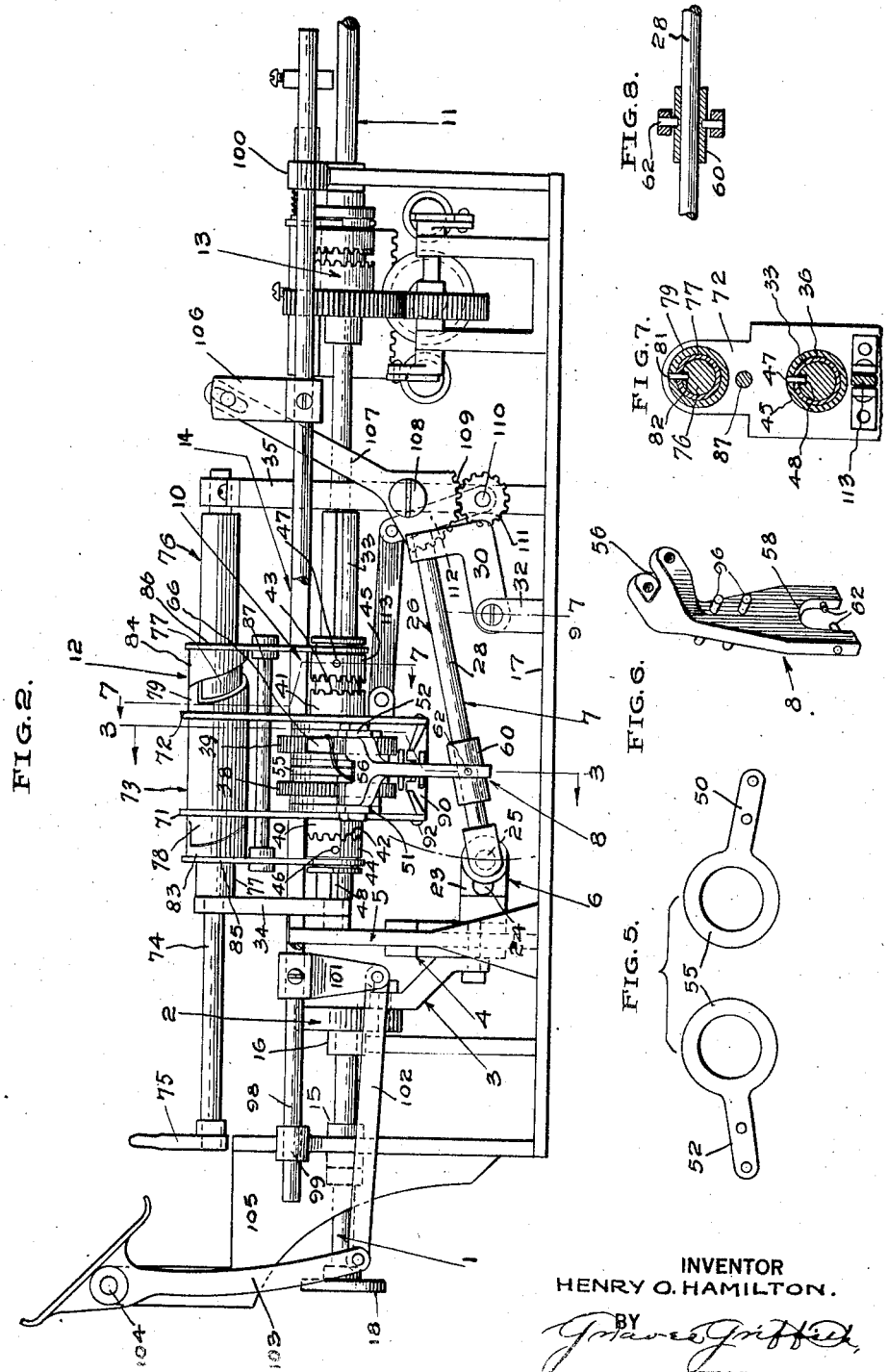

1,589,641

UNITED STATES PATENT OFFICE.

HENRY O. HAMILTON, OF SAN FRANCISCO, CALIFORNIA.

AUTO TRANSMISSION.

Application filed June 29, 1925. Serial No. 40,219.

The present invention relates to improvements in means for the transmission of power in automobile construction, and is of a character dispensing with the employment of the ordinary gearshift and method of reversing.

Primarily, my invention is designed for power transmission and its control in motor driven vehicles, through a continued alternating action of pawls upon ratchet elements loosely borne by a main shaft to be transmitted thence direct to the ring-gear of the ordinary differential for the vehicle's propulsion, thus doing away with the usual clutch mechanism and providing elements insuring smooth, gradual and speedy action in either the direction of acceleration or retardation of speed and an equally speedy and certain action in the reversal of power.

A principal object of the invention is to provide a power transmission for automobiles free from the imperfections of the ordinary clutch, gear-shift and reverse elements and possessed of flexibility rendering variable speed changes of certain, speedy, smooth and easy accomplishment, and the reversal of action of the transmission of an equally certain, speedy, smooth and easy character.

Other objects will present themselves as this specification progresses and be more fully set forth in the claims hereto appended and forming a part thereof.

In the accompanying two sheets of drawings, forming a part of the specification and in which similar characters of reference refer to like parts, throughout, Figure 1 is a top plan view of a transmission embodying the principles of my invention, showing the drive shaft and actuating assembly as they appear when in high gear for forward speed;

Figure 2 is a side elevation of the device, with parts in positions similar to those shown in Figure 1;

Figure 3 is a transverse section taken on line 3—3 of Figures 1 and 2, showing the actuating assembly, reversing mechanism and oscillator;

Figure 4 is a longitudinal medial sectional view taken on the line 4—4 of Figure 1, through the reversing mechanism, the drive shaft, actuating assembly and co-related mechanisms;

Figure 5 is a view of the right and left actuating arms disassociated from the actuating assembly;

Figure 6 is a perspective view of one of the link connections between the actuating assembly and the oscillator;

Figure 7 is a transverse sectional detail taken on lines 7—7 of Figures 2 and 4; and Figure 8 is a horizontal sectional detail of one of the link attaching members carried by the oscillator.

Referring more particularly to the drawings, the invention comprises the several co-related mechanisms constituting the transmission, consisting, in a general way, of the main drive shaft 1, connected at one end to a prime mover (not shown); a balance-wheel 2; a crank 3; a cross-head 4 adapted for rectilineal movement in its guide-ways 5; a cross-head bearing 6 connecting said cross-head to the oscillator 7; link connections 8 and 9 connected at opposite sides to the actuating assembly 10 mounted for rotation upon the driven shaft 11; and the reversing mechanism 12 mounted adjacent the actuating assembly and adapted to co-act therewith.

The fluid pressure brake mechanism 13, shown in the drawings, is connected, through a clutch, to the drive shaft and is actuated by means of a push-rod and foot-pedal mechanism 14.

The main drive shaft 1 is mounted in bearing brackets 15 and 16 extending forwardly from the conventional base plate 17 and is provided at one end with a coupling 18 adapted for securement to the engine crank shaft, and at its other end with a small fly-wheel 2, adapted for connection to the cross-head 4 by means of the crank 3. The cross-head 4 is grooved at its vertical edges 19 and 20 to fit the tongues 21 and 22 of the guide frame 5 and is adapted for rectilineal movement therebetween, through the action of the crank 3 and fly-wheel 2.

The cross-head bearing 6 is rigidly secured to the cross-head and comprises an extension member 23 provided with an elongated slot 24 adapted to receive the cross-arm 25 of the oscillator 7 and compensate for the arcuate movement of said cross-arm 25.

The oscillator 7 comprises a yoke 26 having side arms 27 and 28 and cross arm 25, the side arms being secured at their extremities to bell-crank members 29 and 30 pivotally secured to the posts 31 and 32, the yoke 26, as a whole, being oscillatable about the pivot points of the bell-cranks 29 and 30, through its cross arm 25 and slotted cross-head member 23.

The actuating assembly 10 is mounted for slidable movement upon the enlarged portion 33 of the driven shaft 11, which portion 33 is mounted for rotation between the bearing supports 34 and 35 extending from the base plate 17.

Referring to Figure 4, the actuating assembly comprises a sleeve 36 having a centrally arranged spacing shoulder 37 adapted to space apart and form bearing seats for a pair of ratchet gears 38 and 39, said gears being provided with integral collars 40 and 41 having bores fitting smoothly over the sleeve 36 and adapted for rotation thereon, the outer ends of said collars being provided with clutch teeth 42 and 43 adapted for engagement with either of the clutch collars 44 and 45 slidably splined upon the enlarged portion 33 of the driven shaft by means of keys, or pins, 46 and 47 engaging in the key-way 48 of said shaft, thereby securing the clutch collars 44 and 45 and the sleeve 36 to the driven shaft, but allowing longitudinal movement thereon.

A plurality of actuating arms 49, 50, 51 and 52 are secured in pairs by means of pins 53 and 54, the pairs 49 and 50 being disposed in parallelism upon one side of the shaft, and the pairs 51 and 52 similarly disposed upon the opposite side of said shaft, each of the arms forming the several pairs having at their inner ends concentrically arranged hub members 55 adapted to embrace the central shoulder 37 of the sleeve 36 and the collars 40 and 41 of the ratchet gears and adapted to oscillate freely thereon.

The link connections 8 and 9 are of similar configuration and are comprised of bifurcated upper ends 56 and 56' adapted to form spacers for the several pairs of actuating arms 49, 50, 51 and 52 and to which they are pivotally attached by means of the pins 53 and 54, the lower ends of said links also having bifurcations as indicated at 57 and 58 and adapted to embrace tubular members 59 and 60 carried by the oscillator side arms 27 and 28, the said tubular members being pinned to the ends of said links by pairs of pins 61 and 62 to compensate for the oscillatory movement of said side arms and tubular members, as hereinafter set forth.

A plurality of spring pressed pawls 63, 64, 65 and 66 are mounted between the several pairs of actuating arms 49, 50, 51 and 52, by means of pins 67, 68, 69 and 70, the pawls 63 and 65 being oppositely and reversely disposed and adapted to engage the teeth of the forward speed ratchet gear 38, the pawls 64 and 66 being similarly disposed relative to the reverse speed ratchet gear 39, the said pawls being adapted to actuate in pairs and to intermittently engage their respective ratchet gears, for example, as shown in the drawings, the forward speed gear 38 being connected through its clutch to the shaft is actuated by the pawl 65 on the up stroke of the oscillator 7 and link 8, while the pawl 63 idles, but upon the down stroke of said oscillator and link 9 the pawl 63 becomes active and the pawl 65 idles, the said pawls intermittently imparting substantially a continuous rotative movement to the driven shaft 11.

The ratchet gears 38 and 39 and actuating arms and hubs 55 are maintained in their respective positions by means of hanger plates 71 and 72 having openings to receive the gear collars 40 and 41, said hanger plates, gears and actuating arms being held together and supported as a unit by means of a sleeve 73 mounted for longitudinal movement upon the reversing shaft 74 of the reversing mechanism 12.

The reversing mechanism 12 is mounted directly above the driven shaft and extends in longitudinal parallelism therewith and is actuated by means of a rock-shaft 74 mounted in bearings in the upper ends of the bearing supports 34 and 35 and actuated by means of a convenient hand, or foot, lever 75.

The shaft 74 is provided with an enlarged portion 76 between the bearing supports, the said enlarged portion being provided with a sleeve 77 carrying collars in the form of cam members 78 and 79 splined to the shaft 74 by means of keys, or pins, 80 and 81 adapted for longitudinal movement in the keyway 82, for the purpose hereinafter set forth. Opposing cam collars 83 and 84 are mounted upon the sleeve 77 and adapted to contact the cam members 78 and 79, which are integrally formed with the forked clutch shifter arms 85 and 86, the lower ends of which embrace the clutch collars 44 and 45 of the driven shaft, the said shifter arms being rigidly secured together by the tie-rod 87, which works through openings in the hanger plates 71 and 72.

In the drawings, Figures 1, 2 and 4, the forward speed ratchet-gear clutch 40 is shown in mesh with the clutch collar 44, but, if it is desired to reverse the mechanism, the handle, or foot lever, 75 is reversed to the left, or opposite side, Figure 1, thereby rotating the sleeve 77, carrying the cam members 78 and 79, and forcing the cam collar 83, carrying the shifter arm 85 and clutch collar 44, out of engagement with the cam member 78 and causing the shifter arm 86, carried by the cam 84, to shift the clutch collar 45 into engagement with the clutch collar 41 of the ratchet gear 39.

The lower ends of the hanger plates 71 and 72 are connected together by a bottom plate 88, which is provided at its outer edges with oppositely disposed retaining members 89 and 90 hinged to the plate 88 by means of hinge members 91 and 92, Figure 3, the outer ends of these members being bifurcated, as indicated at 93 and 94, to receive the links 8 and 9, held loosely in engagement therewith by the several sets of pins 95 and 96 mounted in the said links.

The entire unit, or assembly, 10, bearing the reversing mechanism 12, may be moved longitudinally upon the shafts 11 and 74 to vary the throw transmitted from the oscillator 7, through the links 8 and 9, to the actuating arms. It is obvious that the positions of the links 8 and 9 relative to the pivotal centers of the bell-cranks 29 and 30 govern the throw transmitted through the links and pawls to the ratchet gears and, consequently, the speed imparted to the driven shaft 11; the neutral position of the actuating assembly being a position to the extreme right, Figure 4, or, when the vertical center of the links 8 and 9 corresponds to a vertical line 97 drawn through the bell-crank pivot points, as shown.

The actuating means for changing speeds comprises a push-rod 98 mounted in bearings 99 and 100 and adapted for longitudinal movement through an arm 101 connected by a link 102 to a foot pedal 103 pivotally mounted at 104 to a bracket 105 mounted at the forward end of the frame. A second upwardly extending arm 106 is secured to the push-rod and, in turn, pivotally secured to a segment arm 107, pivotally mounted at 108 to the support 35 and provided with a segment 109 at its lower end. A rock shaft 110 is journalled in the support 35 adjacent the segment 109 and provided at its outer end with a pinion 111 adapted to mesh with said segment.

The rock-shaft 110 is provided with a rocker arm 112 adapted for connection to the hanger plate 72, of the actuating assembly, by a link 113, so that upon movement of the push-rod, through actuation of the foot pedal 103 in one direction, the speed is accelerated, or, if in the opposite direction, retarded, through moving the actuating assembly and links 8 and 9 either away from or toward the pivotal points of the oscillator 7.

The brake mechanism 13 is of the reciprocating plunger type adapted to by-pass a liquid, such as oil, from one cylinder to another through a special valve (not shown), the geared connections to the driven shaft being operable by means of a clutch actuated by a shifter-fork and push-rod mechanism 14 connected to a foot pedal (not shown).

It is apparent from the foregoing that I have produced a transmission that may be substituted for the present type transmission of any automobile construction, the driving shaft 1 being adapted for connection to the engine, and the driven shaft 11, through the ordinary universal joint, to the differential assembly of the rear axle.

The arrangement of the link connections and actuating arms, and their slidable connections to the oscillator, adapts this mechanism to be set at a neutral position and to be gradually moved from the pivotal points of the oscillator, or neutral position, toward the cross-arm 25, to increase the leverage and consequent throw imparted through the actuating arms and pawls to the ratchet gears and, finally, to the driven shaft, thereby greatly increasing the efficiency of the engine power transmitted to this shaft and providing an elasticity of action not found in the ordinary transmission.

Having thus described my invention, I claim, and desire to secure by Letters Patent:

1. In an automobile transmission, the combination with a driving shaft and a driven shaft, of an oscillator operatively connected to said driving shaft, an actuating assembly mounted upon said driven shaft and operatively connected to said oscillator, said actuating assembly comprising link connections to said oscillator, actuating arms connecting said link connections to said driven shaft, ratchet wheels loosely mounted upon said driven shaft, pawls mounted upon said actuating arms and adapted to engage said ratchet wheels, and means for shifting said assembly, to vary the speed torque transmitted from said driving shaft through said oscillator to said driven shaft.

2. In an automobile transmission, the combination with a driving shaft and a driven shaft, of an oscilator, a crank between said driving shaft and oscillator, an actuating assembly mounted for slidable movement upon said driven shaft, said assembly comprising link connections mounted to oscillate with said oscillator, actuating arms pivotally connected to said link connections and mounted for movement about said driven shaft, ratchet wheels loosely mounted upon said driven shaft, pawls mounted upon said actuating arms and adapted to engage said ratchet wheels, and means for varying longitudinally the position of said actuating assembly, as a unit, with respect to said oscillator, for varying the speed transmitted through said oscillator and said actuating assembly to the driven shaft.

3. In an automobile transmission, a driven shaft, an actuating assembly mounted for slidable movement upon said driven shaft, said actuating assembly comprising actuating arms mounted for oscillation about said driven shaft and bearing ratchet wheel engaging means, ratchet wheels mounted upon said shaft, clutch means for said ratchet wheels adapted to selectively connect said ratchet wheels to said shaft, and means for imparting an intermittent oscillatory movement to said actuating arms, thereby causing a nearly continuous rotary movement to be transmitted, through either of said ratchet wheels, to said driven shaft.

4. In an automobile transmission, a driven shaft, an actuating assembly mounted for slidable movement upon said driven shaft, said actuating assembly comprising actuating arms mounted for oscillation about said driven shaft and bearing ratchet wheel engaging means, ratchet wheels mounted upon said shaft, clutch means for said ratchet wheels adapted to selectively connect said ratchet wheels to said shaft, means for imparting an intermittent oscillatory movement to said arms, thereby causing a nearly continuous rotary movement to be transmitted, through either of said ratchet wheels, to said driven shaft, and means for varying the throw of said actuating arms to vary the speed transmitted to said driven shaft.

5. In an automobile transmission, a driven shaft, an actuating assembly slidably mounted upon said shaft, said actuating assembly comprising a plurality of actuating arms mounted to oscillate about said driven shaft, ratchet mechanisms borne by said shaft and said actuating arms, clutch means borne by said ratchet mechanisms, clutch collars borne by said driven shaft and adapted for engagement with predetermined of said ratchet mechanism clutches, means for oscillating said actuating arms, and means for moving said actuating assembly as a unit, to vary the stroke transmitted through said actuating arms to the ratchet mechanism.

6. In an automobile transmission, a driven shaft, an actuating assembly slidably mounted upon said driven shaft, said actuating assembly comprising pawl and ratchet mechanisms having forward and reverse speed ratchet gears loosely mounted upon said shaft, clutch means borne by said ratchet mechanisms, clutch collars splined to said driven shaft and adapted for engagement with predetermined of said ratchet gears, means for shifting said clutch collars from forward to reverse speed positions, and means for shifting said actuating assembly as a whole, as and for the purpose specified.

7. An automobile transmission comprising a driven shaft, an actuating assembly slidably mounted upon said driven shaft and comprising a pawl and ratchet mechanism adapted to impart a substantially continuous rotary movement to said shaft, means for reversing said pawl and ratchet mechanism, and means for accelerating and retarding the speed transmitted therethrough to the driven shaft by a predetermined positioning of said actuating assembly with respect to said driven shaft.

8. An automobile transmission comprising a driven shaft, an actuating assembly loosely mounted upon said driven shaft and comprising a sleeve provided with forward and reverse speed ratchet mechanisms bearing clutch members, clutch collars borne by said sleeve, said sleeve and collars being slidably splined to said shaft, means for shifting said clutch collars into and out of engagement with said ratchet clutch members, and means for imparting a nearly continuous rotary movement through said ratchet mechanisms to said driven shaft.

In testimony whereof I have affixed my signature.

HENRY O. HAMILTON.